United States Patent
Masaike

[19]

[11] Patent Number: 6,091,459
[45] Date of Patent: Jul. 18, 2000

[54] ON-SCREEN-DISPLAY CIRCUIT

[75] Inventor: Yasufumi Masaike, Kanagawa, Japan

[73] Assignee: NEC Corportion, Tokyo, Japan

[21] Appl. No.: 08/922,249

[22] Filed: Sep. 2, 1997

[30] Foreign Application Priority Data

Sep. 2, 1996 [JP] Japan .................................. 8-231872

[51] Int. Cl.$^7$ ................................................. H04N 5/50
[52] U.S. Cl. ........................ 348/569; 348/569; 348/570;
348/589; 348/600; 348/239
[58] Field of Search .................... 348/569, 570,
348/589, 600, 239; 345/114, 150, 213

[56] References Cited

U.S. PATENT DOCUMENTS

| 3,432,219 | 3/1969 | Shenker et al. | 348/36 |
| 5,181,113 | 1/1993 | Chang | 348/468 |
| 5,264,881 | 11/1993 | Brooke | 353/94 |
| 5,343,249 | 8/1994 | Moon | 348/564 |
| 5,587,723 | 12/1996 | Otake | 348/596 |
| 5,724,104 | 3/1998 | Eom | 348/569 |

FOREIGN PATENT DOCUMENTS 3-84692  8/1991  Japan .

Primary Examiner—John K. Peng
Assistant Examiner—Billy M. K. Huang
Attorney, Agent, or Firm—Hutchins, Wheeler & Dittmar

[57] ABSTRACT

To provide an OSD circuit needing little load for the control command transfer for displaying a background color, a OSD circuit of the invention comprises a background color control circuit (4) for out-putting three color signals and a blanking signal generated by a character generator (3), when a background control signal supplied from the command processor is inactive, said background control signal made active when the video picture is to be replaced with a background color, and outputting the three color signals generated by the character generator during the blanking signal is active and background color signals for displaying the background color during the blanking signal is inactive, together with a background blanking signal for suppressing signals of all of the video picture instead of the blanking signal, when the background control signal is active.

12 Claims, 5 Drawing Sheets 6,091,459

ON-SCREEN-DISPLAY CIRCUIT

BACKGROUND OF THE INVENTION

The present invention relates to an On-Screen-Display (hereafter abbreviated as OSD) circuit for displaying additional information such as a channel number, present time or the like on a video display screen of a television receiver, for example, and particularly to an OSD circuit having also a function for controlling background color of the video display screen.

Recently, in many audiovisual units, a background color, blue-back color in general, is displayed when no video signal is supplied, that is, when a television receiver is tuned to an invalid channel or a video player is reproducing a non-recorded part of a video tape. Generally, the background color is prepared by the OSD circuit.

FIG. 4 is a block diagram illustrating basic configuration of the OSD circuit, wherein an OSD generation section 1/10 generates OSD signals having RGB (Red, Green and Blue) components for displaying characters and/or symbols indicated by a microcomputer 5, and the OSD signals are mixed with video signals in a mixer 6 to be supplied to a display device (not shown in the drawings).

An apparatus for displaying the blue-back color to be applied in the OSD circuit of FIG. 4 is disclosed in a Japanese utility model registration application laid open as a Provisional Publication No. 84692/'91.

FIG. 5 is a circuit diagram illustrating the prior apparatus provided between the OSD generation section 10 and the mixer 6, comprising a switching circuit 7 and the diodes D1 and D2. The OSD generation section 10 generates RGB signals for displaying the OSD characters and a blanking signal L for making blank areas where the OSD characters are displayed to be supplied to the mixer 6. The switching circuit 7 cuts the R and G signals and sets the B signal at a background color level VB when the blanking signal L is inactive. The diodes D1 and D2 are used for maintaining LOW level of the blanking signal L at the background color level VB.

The blanking signal L is made active when the RGB signals generated by the OSD generation section 10 are to be supplied to the display device. So, when the background color level VB remains inactive, the RGB signals generated by the OSD generation section 10 or the video signals are supplied to the display device according to logic of the blanking signal L. When the background color level VB is active, a blue-back signal BB and a background blanking signal LB both having the background color level VB are supplied to the mixer 6 during the blanking signal L generated by the OSD generation circuit 10 is inactive, and the RGB signals generated by the OSD generation section 10 are displayed on a blue-back screen.

However, in the prior art of FIG. 5, it is needed to assemble many parts, such as the switching circuit 7 and the diodes D1 and D2, besides the OSD generation section 10, as well as to provide an additional circuit for generating the background color level VB. Furthermore, there is a problem in the prior apparatus that when the blue-back signal BB is generated irrespective of the horizontal and the vertical blanking intervals, synchronous signals in the output of the mixer 6 are destroyed, making the outputs of the mixer 6 inconvenient to be reused, to be recorded by another video player, for example.

Therefore, an OSD generation section 10 including a character generator which generates directly the blue-back color signal, when controlled by the microcomputer 5, is used in recent OSD circuits.

FIG. 6 is a schematic diagram illustrating a configuration of this type of the OSD generation section 10, comprising a command processor 2 and a character generator 3.

The command processor 2 generates a control signal CS and control data CD according to control commands CM supplied from the microcomputer 5 of FIG. 4. The control data CD include character data for indicating characters and/or symbols and their color to be displayed and position data for indicating where they are to be displayed. Operating in synchronous with vertical and horizontal synchronous signals $\overline{V}$ and $\overline{H}$ (at LOW level when active), the character generator 3 generates the RGB signals corresponding to the control data CD together with the blanking signal L, or the blue-back signal BB and the background blanking signal LB, according to the control signal CS and the control data CD.

FIG. 7 is a block diagram illustrating a conventional example of the character generator 3 of FIG. 6.

The conventional example of FIG. 7 comprises;
  a character ROM 31 for storing font data FD, which are read out accessed with a character address AC,
  a display control RAM 32 for storing display control data according to the control signal CS and the control data CD, the display control data being accessed with a display address AD for outputting the character address AC and a font color signal FC,
  a display address control circuit 33 for generating the display address AD indicating vertical and horizontal positions of the OSD characters according to the vertical and horizontal synchronous signal $\overline{V}$ and $\overline{H}$, being supplied with the control signal CS and the control data CD,
  an output circuit 35 supplied with the font data FD, the font color signal FC, the control signal CS and the control data CD for outputting the RGB signals and the blanking signal L or the blue-back signal BB and the background blanking signal LB, and
  a clock generator 34 for generating clock signal CK used in the character generator 3 in synchronous with the horizontal synchronous signals $\overline{H}$.

Now, operation of the OSD circuit having the conventional character generator 3 of FIG. 7 is described referring to FIGS. 4, 6 and 7.

The microcomputer 5 outputs the control commands CM concerning information to be displayed, which are decoded by the command processor 2 into the control signal CS and the control data CD. The display control data concerning characters to be displayed and their positions on-screen indicated by the control data CD are stored in corresponding display addresses in the display control RAM 32 in the character generator 3. In the display control RAM 32, display addresses mapped corresponding to an OSD format, 12 lines×24 columns=288 characters, for example, are prepared.

In each of display addresses corresponding to where no OSD information is to be displayed, a specific character address AC, (display-off address, is written for inhibiting the OSD outputs.

When green characters "AB" are to be displayed on beginning two columns of the first line, character addresses AC of the character ROM 31, where font data FD of 'A' and 'B' are prepared, are stored in the first and second display address of the display control RAM 32, respectively, together with color data indicating font color signal FC for outputting G signal, while the display-off address is stored in every of other display addresses. Therefore, when the vertical and horizontal synchronous signals $\overline{V}$ and $\overline{H}$ are scanning beginning two columns of the first line, where the green characters "AB" are to be displayed, the output circuit 35 outputs G signal, according to the font data FD read out from the character ROM 31 and the font color signal FC output of the display control RAM 32.

Thus, the green characters "AB" are displayed on-screen of a video picture, when video signals are supplied.

When there is no video signal and the blue-back display is indicated by a control command CM from the microcomputer 5, the command processor 2 controls the output circuit 35 to output the blue-back signal BB when the blanking signal L is at LOW level. However, when the display-off address, having a high priority, is stored in the display addresses of the display control RAM 32, generation of the RGB signals and the blanking signal L is inhibited when screen areas corresponding to the display addresses having the display-off address are scanned, letting invalid video signals be displayed. Therefore, every one of the display-off addresses written in the display control RAM 32 must be replaced with a character address AC indicating a filler character whereof all pixels are OFF, for example.

FIG. 8 is a flowchart illustrating above operation for replacing the display-off addresses with the character address AC of the filler character.

For displaying the blue-back color, the output circuit 35 is indicated to output the blue-back signal BB (at step P1) with a control command CM from the microcomputer 5. Then a display address of the display control RAM 32 is set (at step P2) according to another control command CM, and the display-off address therein is replaced with the character address AC of the filler character (at step P3). Steps P2 and P3 are repeated until all the display-off addresses are found (at step P4) to be replaced with the character address AC of the filler character.

Therefore, a certain amount of data for the control commands CM must be transferred from the microcomputer 5 to the OSD generation circuit 10, occupying output port of the microcomputer 5 exclusively.

As heretofore described, in the prior apparatus of FIG. 5, it is needed to assemble many parts, such as the switching circuit 7 and the diodes D1 and D2, besides the OSD generation section 10, as well as to provide an additional circuit for generating the background color level VB. Furthermore, there is another problem that when the blue-back signal BB is generated irrespective of the horizontal and the vertical blanking intervals, synchronous signals in the output of the mixer 6 are destroyed, making the outputs of the mixer 6 inconvenient to be reused.

In another conventional OSD generation section of FIG. 7, there is a problem of the heavy load of control command transfer for replacing the display-off address with the character address of the filler character.

SUMMARY OF THE INVENTION

Therefore, a primary object of the present invention is to provide an OSD circuit which needs no additional parts to be assembled afterwards and little load for the control command transfer for displaying a background color, without destroying synchronous signals of a video picture with which the OSD signal are mixed even when the background color is displayed.

In order to achieve the object, an OSD circuit of the invention having a command processor for decoding control commands into display control data, and a character generator, operating in synchronous with a vertical synchronous signal and a horizontal synchronous signal of a video picture, for generating three color signals for displaying OSD information on the video picture and a blanking signal for suppressing signals of parts of the video picture where the OSD information is displayed, comprises:

a background color control circuit for outputting the three color signals and the blanking signal generated by the character generator, when a background control signal supplied from a command processor is inactive, said background control signal made active when the video picture is to be replaced with a background color, and outputting the three color signals generated by the character generator during the blanking signal is active and background color signals for displaying the background color during the blanking signal is inactive, together with a background blanking signal for suppressing signals of all of the video picture instead of the blanking signal, when the background control signal is active.

Therefore, generation of the background color signals and the background blanking signal is controlled only with one command, remarkably reducing the date transfer load. Furthermore, the background color signals and the background blanking signal can be suppressed in the vertical and horizontal intervals, enabling reuse of the output signals even when the background color is displayed.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
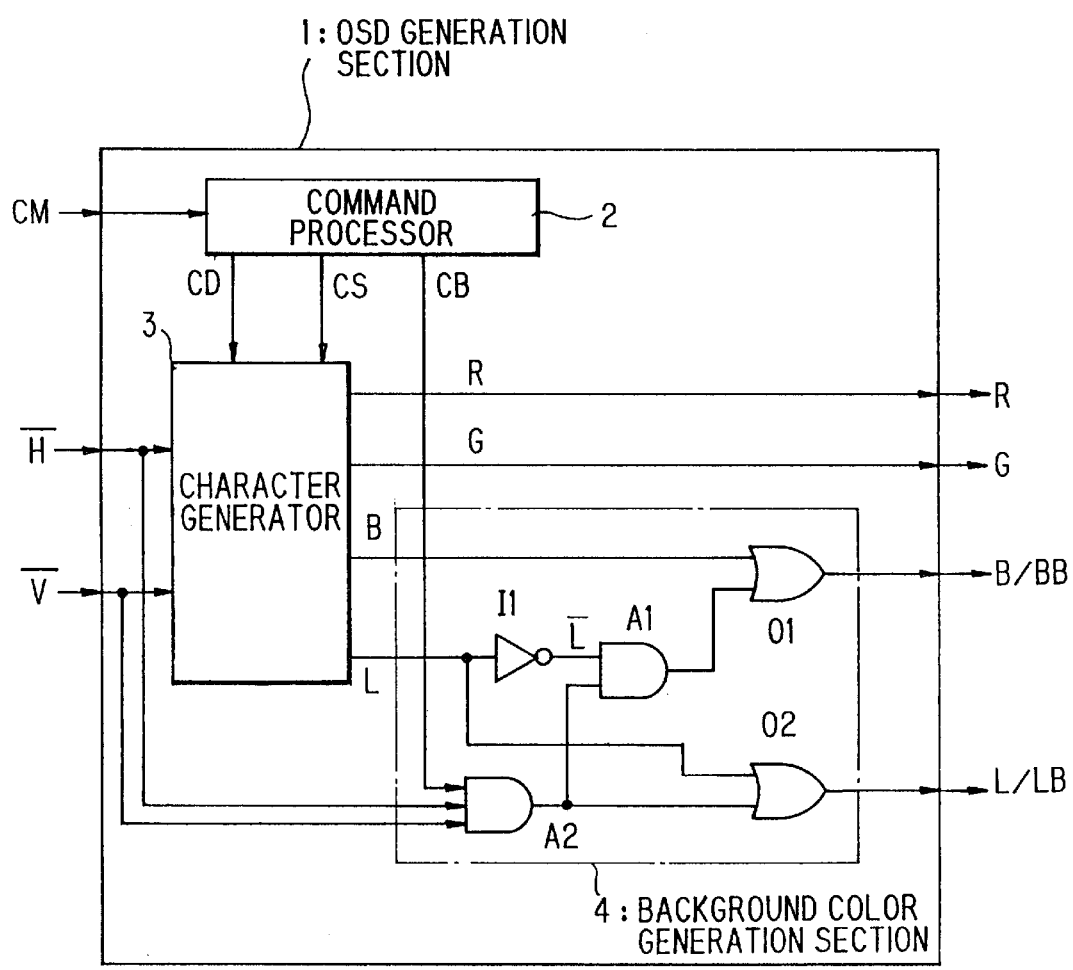
FIG. 1 is a block diagram illustrating an OSD generation section 1 to be applied in an OSD circuit according to an embodiment of the invention.

FIG. 1 is a block diagram illustrating an OSD generation section 1 to be applied in an OSD circuit according to an embodiment of the invention.

Figure 7:
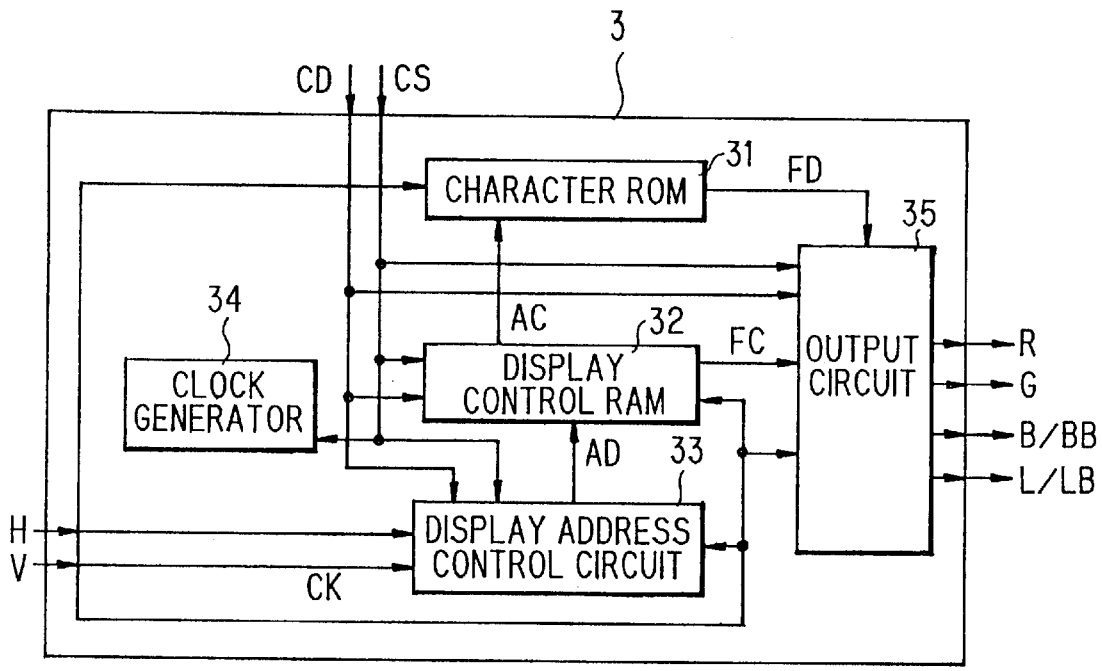
FIG. 7 is a block diagram illustrating a conventional example of the character generator 3 of FIG. 6.
Figure 8:
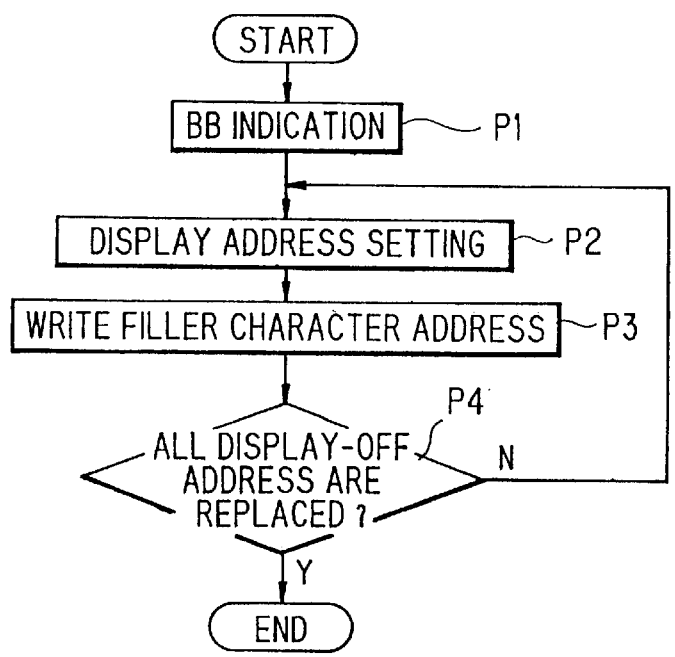
FIG. 8 is a flowchart illustrating operation of the conventional example of FIG. 7 for replacing the display-off addresses with the character address AC of the filler character.

Referring to FIG. 1, the OSD generation section 1 comprises a background color generation section 4 together with a command processor 2 and a character generator 3. The command processor 2 and the character generator 3 may have similar configurations with those of the conventional example described in connection with FIG. 7, except that the command processor 2 of FIG. 1 outputs a background color control signal CB to be supplied to the background color control section 4 instead of controlling the character generator 3 to output the blue-back signal BB and the background blanking signal LB, and duplicated description thereof is omitted.

The background color generation circuit 4 comprises;

an inverter I1 for inverting the blanking signal L into an inverted blanking signal $\overline{L}$, a three input AND gate A2 for outputting AND logic of the background control signal CB and the vertical and horizontal synchronous signals $\overline{V}$ and $\overline{H}$, a two input AND gate A1 for outputting AND logic of the output of the three input AND gate A2 and the inverted blanking signal $\overline{L}$, a first OR gate O1 for outputting B signal or the blue-back signal BB by obtaining OR logic of the output of the two input AND gate and the B signal generated by the character generator 3, and a second OR gate O2 for outputting the blanking signal L or the background blanking signal LB by obtaining OR logic of the blanking signal L and the output of the three input AND gate A2.

Figure 2:
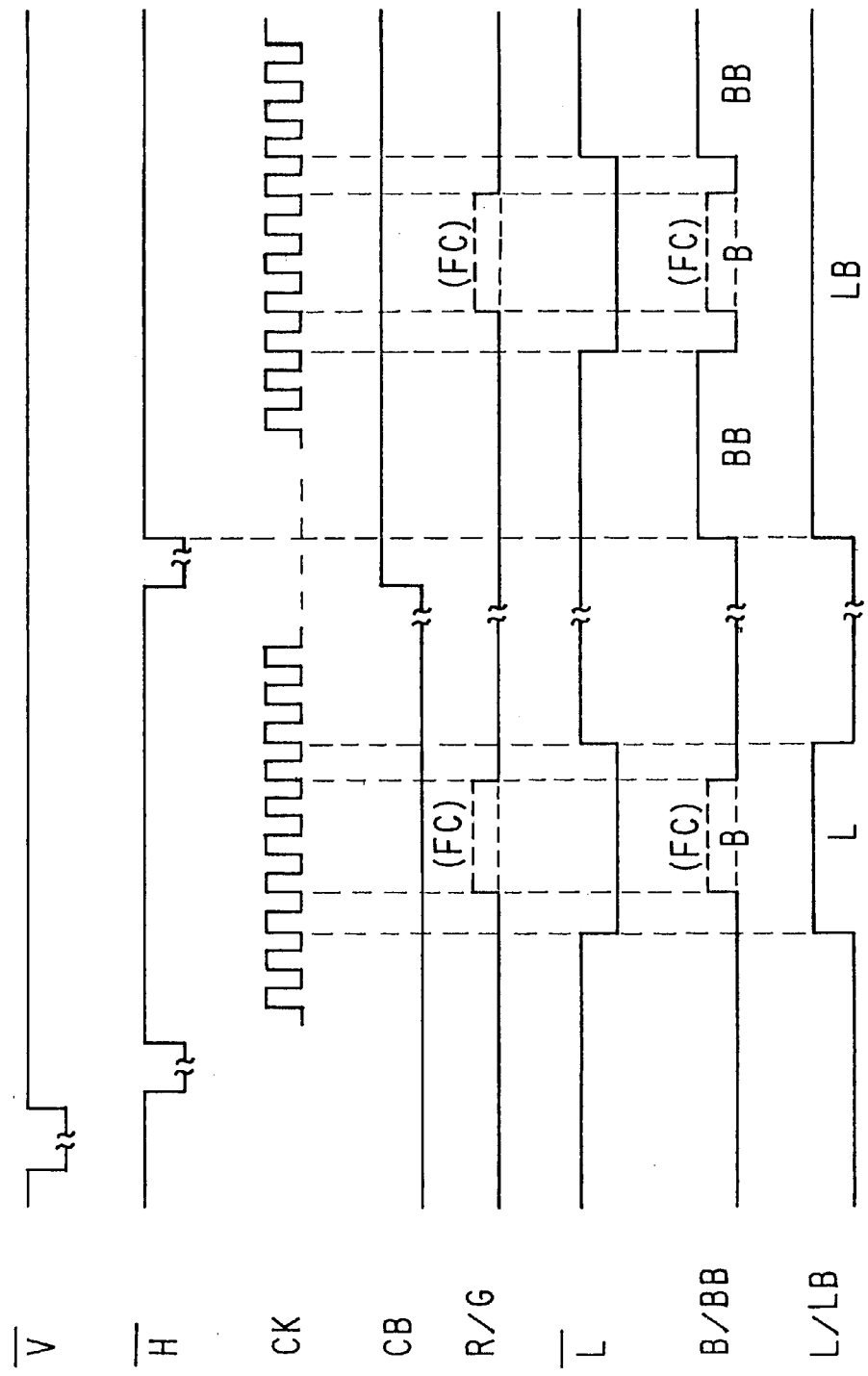
FIG. 2 is a timing chart illustrating operation of the background color generation circuit 4 of FIG. 1.

Now, operation of the background color generation circuit 4 of FIG. 1 is described referring to a timing chart of FIG. 2 illustrating signals therein.

When video signals are supplied, the background control signal CB is maintained at LOW level as shown in left part of FIG. 2, indicated by control commands CM from the microcomputer 5. So, both the outputs of the three input AND gate A2 and the two input AND gate A1 remaining at LOW level, the RGB signals having values indicated by the font color signal FC and the blanking signal L, which is two cycles wider than the RGB signals for framing the OSD character font with black lines, generated by the character generator 3 are output through the first and the second OR gates O1 and O2.

When no video signal is supplied, a control command CM is transferred from the microcomputer 5 to the command processor 2 of the OSD generation section 1 and the background control signal CB is made active at HIGH level, as shown in right part of FIG. 2. So, during effective scanning periods, that is when both the vertical and horizontal synchronous signals $\overline{V}$ and $\overline{H}$ are at HIGH level, the output of the three input AND gate A2 becomes HIGH, which is output as the background blanking signal LB through the second OR gate O2 for suppressing invalid video signals to be displayed. When the inverted blanking signal $\overline{L}$ is at HIGH level, the two input AND gate A1 becomes open and the output of the three input AND gates is output as the blue-back signal BB to be displayed instead of the invalid video signals through the first OR gate O1. The blue-back signal BB is suppressed when the inverted blanking signal $\overline{L}$ is at LOW level, and the RGB signals are output for displaying the OSD characters as shown in right part of FIG. 2, in the same way when the background color control signal CB is at LOW level.

Thus, in the OSD circuit of the embodiment provided with the background color generation circuit 4, generation of the blue-back signal BB and the background blanking signal LB is controlled only with one command from the microcomputer 5, remarkably reducing the data transfer load.

Furthermore, the blue-back signal BB and the background blanking signal LB of the embodiment are suppressed in the vertical and horizontal intervals, enabling reuse of the output signals of the mixer 6 for other applications.

Figure 3:
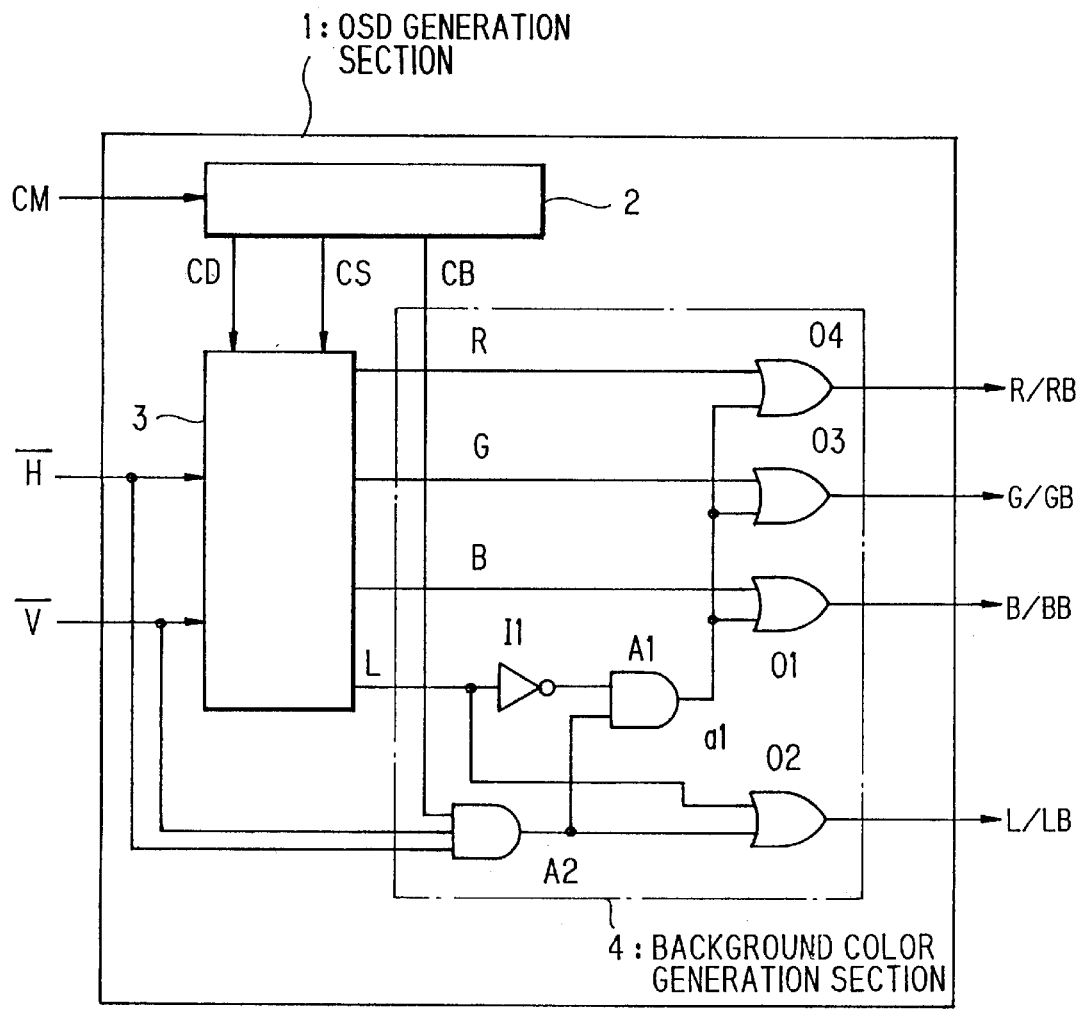
FIG. 3 is a block diagram illustrating another embodiment of the invention.
Figure 4:
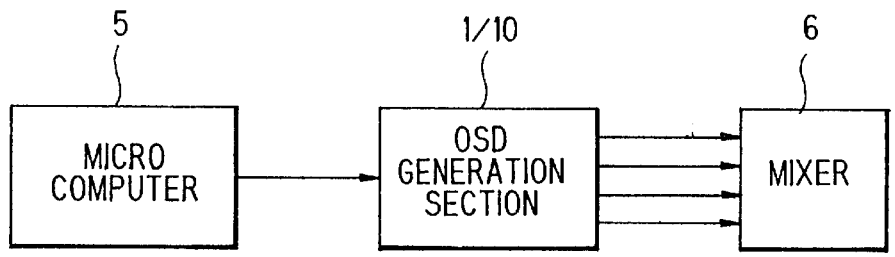
FIG. 4 is a block diagram illustrating basic configuration of the OSD circuit.
Figure 5:
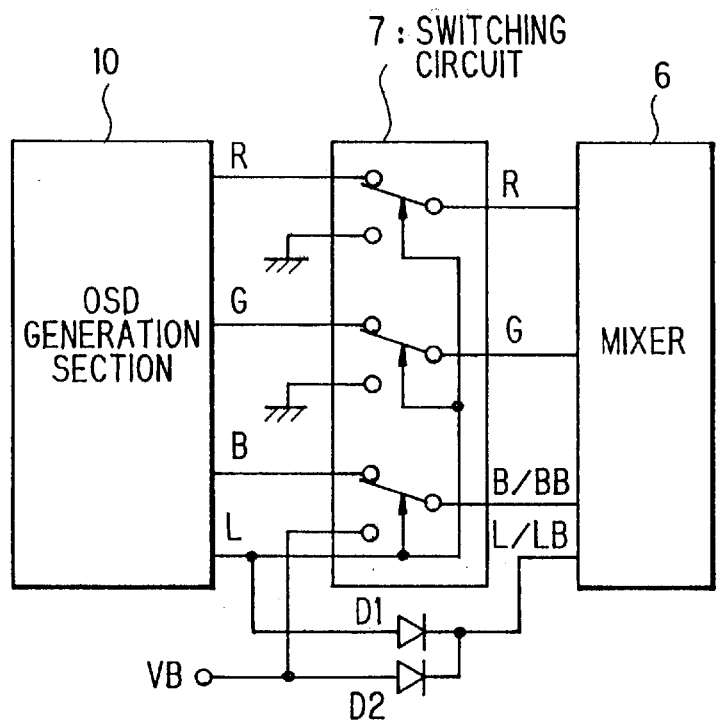
FIG. 5 is a circuit diagram illustrating the prior apparatus provided between the OSD generation section 10 and the mixer 6 of FIG. 4.
Figure 6:
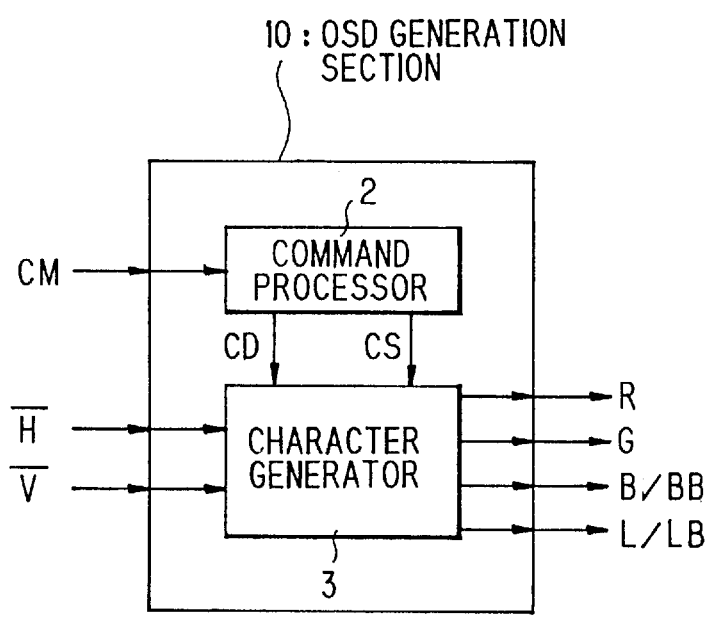
FIG. 6 is a schematic diagram illustrating a configuration of another type of the OSD generation section 10 of FIG. 4.

Heretofore, the present invention is described in connection with the background color generation circuit 4 of FIG. 1 for displaying blue-back color. However, various applications can be considered in the scope of the invention. For example, an OSD generation circuit for displaying a whiteback color can be configured by further providing a third and a fourth OR gates O3 and O4 in the background color generation section 4, each outputting AND logic of the output of the two input AND gate A1 and the G signal or the R signal, respectively, as shown in FIG. 3.

What is claimed is:

1. An OSD (On-Screen-Display) circuit having a command processor for decoding control commands into display control data, and a character generator, the character generator circuit operating synchronously with a vertical synchronous signal and a horizontal synchronous signal of a video picture and generating three color signals for displaying OSD information on the video picture and a blanking signal for suppressing signals of parts of the video picture where the OSD information is displayed, said OSD circuit further comprising:

a background color control circuit which outputs, when a background control signal supplied from the command processor is inactive, the three color signals and the blanking signal generated by the character generator, wherein said background control signal is made active when the video picture is to be replaced with a background color, and outputs the three color signals generated by the character generator, when the blanking signal is active, and a background color signal for displaying said background color when the blanking signal is inactive, and outputs, when said background control signal is active, instead of the blanking signal a background blanking signal produced in response to the vertical synchronous signal and the horizontal synchronous signal and the background control signal for suppressing signals of all of the video picture.

2. The OSD circuit claimed in claim 1, said background color control circuit comprising:

a three input AND gate receiving the vertical synchronous signal, the horizontal synchronous signal and the background control signal and outputting AND logic of the vertical synchronous signal, the horizontal synchronous signal and said the background control signal;

an inverter for inverting the blanking signal;

a two input AND gate receiving the the output of said three input AND gate and said inverted blanking signal and outputting AND logic thereof;

a first OR gate receiving one of the three color signals generated by the character generator and the AND logic output from the two input AND gate, and outputting one of the three color signals when the blanking signal is active and one of said background color signals when the blanking signal is inactive; and a second OR gate receiving the blanking signal and the output of said three input AND gate, and outputting the blanking signal when said background control signal is inactive and said background blanking signal when said background control signal is active.

3. The OSD circuit claimed in claim 2, said background color control circuit further comprising at least one additional OR gate, wherein said additional OR gate receives an additional one of the three color signals generated by the character generator and the AND logic output from the two input AND gate, and outputs said additional color signal when the blanking signal is active and said background color signals when the blanking signal is inactive.

4. A background color control circuit, comprising:
(a) a first gate coupled to a background color control signal and to horizontal and vertical synchronous signals, said first gate providing a background blanking signal when the background color control signal is active and the synchronous signals are not active;
(b) a second gate coupled to the background blanking signal and to a blanking signal, said second gate providing an active output when the background blanking signal is active and the blanking signal is not active;
(c) a third gate, coupled to the background blanking signal and to the blanking signal, said third gate providing an active output when at least one of the blanking signal and the background blanking signal is active; and
(d) a fourth gate, coupled to a first color input and to the output of the second gate, said fourth gate providing the first color input when the output of the second gate is not active and providing a background color when the output of the second gate is active.

5. The background color control circuit, according to claim 4, further comprising:
(e) a fifth gate, coupled to a second color input and to the output of the second gate, said fifth gate providing the second color input when the output of the second gate is not active and providing a background color when the output of the second gate is active; and
(f) a sixth gate, coupled to a third color input and to the output of the second gate, the sixth gate providing the third color input when the output of the second gate is not active and providing a background color when the output of the second gate is active.

6. The background color control circuit, according to claim 4, wherein the first and second gates are AND gates and the third and fourth gates are OR gates and wherein the blanking signal is inverted prior to being input to the second gate.

7. The background color control circuit, according to claim 4, wherein the background color control signal is provided by a command processor and the first input color signal and the blanking signal are provided by a character generator.

8. A background color control circuit, comprising:
(a) first input means for receiving a background color control signal;
(b) second input means for receiving a color signal;
(c) third input means for receiving a blanking signal;
(d) fourth input means for receiving horizontal and vertical synchronous signals;
(e) first output means for providing the color signal received via the second input means when the background color control signal is not active and for providing a background color signal when the background color control signal is active, said background color signal being suppressed in response to the fourth input means indicating one of the synchronous signals is not active; and
(f) a second output means for providing one of the blanking signal and a background blanking signal, wherein said background blanking signal is provided when the background color control signal is active and suppressed when the fourth input means indicates that one of the synchronous signals is active.

9. The background color control circuit, according to claim 8, wherein the background color control signal and the synchronous signals are provided to a first AND gate that generates the background blanking signal.

10. The background color control circuit, according to claim 9, wherein the background blanking signal and a blanking signal are provided to a second AND gate that generates the background color signal.

11. The background color control circuit, according to claim 10, wherein the background color signal and the color signal are provided to at least one OR gate that outputs one of the signals provided thereto.

12. The background color control circuit, according to claim 11, wherein the first input means is coupled to a command processor and wherein the second and third input means are coupled to a character generator.

* * * * *